US007491955B2

(12) United States Patent
Shiraishi

(10) Patent No.: US 7,491,955 B2
(45) Date of Patent: Feb. 17, 2009

(54) EUV LIGHT SOURCE, EUV EXPOSURE SYSTEM, AND PRODUCTION METHOD FOR SEMICONDUCTOR DEVICE

(75) Inventor: Masayuki Shiraishi, Kumagaya (JP)

(73) Assignee: Nikon Corporation, Tokyo (JP)

( * ) Notice: Subject to any disclaimer, the term of this patent is extended or adjusted under 35 U.S.C. 154(b) by 243 days.

(21) Appl. No.: 11/629,498

(22) PCT Filed: Jun. 22, 2005

(86) PCT No.: PCT/JP2005/012007

§ 371 (c)(1),
(2), (4) Date: Dec. 14, 2006

(87) PCT Pub. No.: WO2006/006408

PCT Pub. Date: Jan. 19, 2006

(65) Prior Publication Data

US 2008/0043213 A1 Feb. 21, 2008

(30) Foreign Application Priority Data

Jun. 24, 2004 (JP) ............................ 2004-186132

(51) Int. Cl.
*G01N 21/33* (2006.01)
*G01J 3/10* (2006.01)
*H05H 1/24* (2006.01)

(52) U.S. Cl. .................. 250/504 R; 250/365; 250/372; 315/111.21

(58) Field of Classification Search ............. 250/504 R, 250/365, 372; 315/111.21
See application file for complete search history.

(56) References Cited

U.S. PATENT DOCUMENTS

| | | | |
|---|---|---|---|
| 6,560,313 | B1 | 5/2003 | Harding et al. |
| 2002/0070353 | A1 | 6/2002 | Richardson |

(Continued)

FOREIGN PATENT DOCUMENTS

| | | |
|---|---|---|
| JP | 2001-023795 A | 1/2001 |

(Continued)

OTHER PUBLICATIONS

Japanese Search Report dated Nov. 9, 2005 for International Application No. PCT/JP2005/012007.

(Continued)

*Primary Examiner*—Nikita Wells
(74) *Attorney, Agent, or Firm*—Finnegan, Henderson, Farabow, Garrett & Dunner LLP

(57) ABSTRACT

An Sn—Ga type alloy having a composition in which the atomic % of Sn is 15% or less is accommodated inside a heated tank 4. The Sn alloy pressurized by the pressurizing pump is conducted to a nozzle 1, so that a liquid-form Sn alloy is caused to jet from the tip end of this nozzle 1 disposed inside a vacuum chamber 7. The liquid-form Sn alloy that is caused to jet from the nozzle 1 has a spherical shape as a result of surface tension, and forms a target 2. Laser light generated by an Nd:YAG laser light source 8 disposed on the outside of the vacuum chamber 7 is focused by a lens 9 and introduced into the vacuum chamber 7. The target 2 that is irradiated by the laser is converted into a plasma, and radiates light that includes EUV light.

13 Claims, 8 Drawing Sheets

U.S. PATENT DOCUMENTS

| | | | | |
|---|---|---|---|---|
| 2003/0080302 | A1 | 5/2003 | Yashiro | |
| 2003/0194055 | A1 | 10/2003 | Mochizuki | |
| 2005/0167617 | A1 | 8/2005 | Derra et al. | |
| 2008/0087847 | A1 * | 4/2008 | Bykanov et al. | 250/504 R |
| 2008/0179548 | A1 * | 7/2008 | Bykanov et al. | 250/504 R |

FOREIGN PATENT DOCUMENTS

| | | | |
|---|---|---|---|
| JP | 2001-155670 | A | 6/2001 |
| JP | 2003-008124 | A | 1/2003 |
| JP | 2003-133100 | A | 5/2003 |
| JP | 2003-303696 | A | 10/2003 |
| JP | 2004-288517 | A | 10/2004 |
| WO | WO 00/19496 | A1 | 4/2000 |
| WO | WO 01/31678 | A1 | 5/2001 |
| WO | WO 02/46839 | A2 | 6/2002 |
| WO | WO 03/094581 | A1 | 11/2003 |

OTHER PUBLICATIONS

Japanese Search Report dated Sep. 28, 2005 for International Application No. PCT/JP2005/011865.

* cited by examiner

EUV LIGHT SOURCE, EUV EXPOSURE SYSTEM, AND PRODUCTION METHOD FOR SEMICONDUCTOR DEVICE

TECHNICAL FIELD

The present invention relates to an EUV light source which generates EUV light (extreme ultraviolet light; in the present specification and claims, this refers to light having a wavelength of 13.5 nm), as well as an EUV exposure apparatus using this EUV light source, and a semiconductor device manufacturing method using this EUV exposure apparatus.

BACKGROUND ART

As the degree of integration of semiconductor integrated circuits has increased, circuit patterns have become finer, and the resolution has become insufficient in the case of conventionally used exposure apparatuses utilizing visible light or ultraviolet light. As is universally known, the resolution of an exposure apparatus is proportional to the numerical aperture (NA) of the transfer optical system, and is inversely proportional to the wavelength of the light that is used for exposure. Accordingly, as one means of increasing the resolution, there have been attempts to use a short-wavelength EUV light source (also called a "soft X-ray" light source) for exposure and transfer instead of visible light or ultraviolet light.

Light sources that are considered to be especially promising as EUV light generating devices used in such exposure and transfer apparatuses are laser plasma EUV light sources (these may be referred to below as "LPP (laser produced plasma)") and discharge plasma ETV light sources.

In LPP, pulsed laser light is focused on a target material inside a vacuum vessel so that this target material is converted into a plasma, and the EUV light that is radiated from this plasma is utilized. Such devices have a brightness comparable to that of an undulator, while at the same time being compact.

Furthermore, EUV light sources using a discharge plasma such as dense plasma focus (DPF) are compact, produce a large amount of EUV light, and are inexpensive. In recent years, these light sources have attracted attention as light sources for EUV exposure apparatuses using EUV light with a wavelength of 13.5 nm.

An outline of such an EUV exposure apparatus is shown in FIG. 8. In this figure, IR1 through IR4 are reflective mirrors of an illumination optical system, and PR1 through PR4 are reflective mirrors of a projection optical system. W is a wafer, and M is a mask.

Laser light emitted from a laser light source L is focused on a target S, and X-rays are generated, from the target S by the plasma phenomenon. These X-rays are reflected by reflective mirrors C and D, and are incident on the illumination optical system as parallel X-rays. Then, the X-rays are successively reflected by the reflective mirrors IR1 through IR4 of the illumination optical system, and illuminate an illuminated region on the mask M. The X-rays reflected by the pattern formed on the mask M are successively reflected by the reflective mirrors PR1 through PR4 of the projection optical system, so that an image of the pattern is focused on the surface of the wafer W.

EUV light source utilizing an Xe plasma using Xe gas or liquefied Xe as target substance have been widely researched and developed for EUV light sources with a wavelength of 13.5 nm that is thus used in EUV exposure apparatuses (as well as both laser plasma light sources and discharge plasma light sources). The reasons for this are that a relatively high conversion efficiency (ratio of EUV light intensity obtained to input energy) is obtained, and that the problem of debris (scattered particles) tends not to occur since Xe is a gaseous material at ordinary temperatures.

However, in the case of techniques using Xe gas as a target, there are limits to how far a higher output EUV light source can be obtained, so that there is a demand for the use of other substances. In particular, Sn is known as an element that emits the same 13.5-nm EUV light as Xe. Furthermore, it is also known that if Sn is used, a conversion efficiency higher than that of Xe can be obtained.

However, since Sn is a metal (solid), the following problems are encountered:

(1) In the case of a laser plasma light source, a large amount of debris is generated when the solid Sn target is irradiated with the laser. If the Sn is supplied after being heated and converted into a vapor in order to avoid this problem, the density is reduced, so that a sufficiently high conversion efficiency cannot be obtained. Furthermore, solidification occurs in the low-temperature peripheral areas, so that there is a large amount of adhesion in these areas.

(2) In the case of a discharge plasma light source, it is difficult to supply a material in a solid state to the discharge space (the space where the plasma is generated between the electrodes). If the material is supplied after being heated and vaporized, the material solidifies in the peripheral low-temperature areas, so that large amounts of material adhere in these areas.

Accordingly, although it is known that Sn is a high-efficiency material, it has been difficult to use Sn "as is" as a target substance in EUV light sources. Consequently, various methods have been tried in order to overcome the demerit of Sn being a solid, which is a problem in cases where Sn is used.

For example, methods are known in which a water-soluble Sn salt is dissolved in water or another solvent and supplied as a target. In such methods, however, the following problem arises: namely, although water is eliminated by evaporation from the scattered debris following plasma generation, the Sn salt adheres to and contaminates the mirror surface as a solid just as before. Even if an attempt is made to remove the debris adhering to the mirror surface by heating and melting the debris, the heat resistance temperature of the multilayer film on the mirror surface is about 100° C. at the most; accordingly, it is not possible to achieve a very high temperature. Furthermore, even if a highly heat-resistant multilayer film that can withstand a temperature of several hundred degrees Celsius is used, there is some concern that the mirror substrate will not be able to withstand this temperature.

Accordingly, there has been a demand for a supply substance which can be continuously supplied as a target by producing a liquid whose main component is Sn (at room temperature or a lower temperature if possible), and in which scattered debris can also be easily liquefied and removed.

DISCLOSURE OF THE INVENTION

The present invention was devised in light of such circumstances; it is an object of the present invention to provide an EUV light source which makes it possible to obtain a high conversion efficiency by allowing the use of liquid-form Sn, and in which the removal of debris is also easy, as well as an EUV exposure apparatus using this EUV light source, and a semiconductor device manufacturing method using this EUV exposure apparatus.

The first invention that is used to achieve the object described above is an EUV light source in which a target substance is converted into a plasma, and the EUV light that is emitted in this case is used as a light source, wherein the target is an Sn—Ga (tin-gallium) type alloy in which the atomic % of Sn is 15% or less.

As a result of investigating methods using Sn as a target substance in plasma EUV light sources, the inventor focused on the fact that if the melting point of Sn is lowered as far as possible so that the Sn can be used in a liquid state, the removal of the debris that is generated becomes easy. The melting point of Sn itself is 232° C.; as was described above, when Sn is used "as is," the removal of debris adhering to the mirror is difficult. However, if the melting point can be lowered by alloying the Sn, the Sn can be used in a liquid state; furthermore, if the temperature of the mirror can be raised (to a temperature that does not damage the multilayer film of the mirror), then the adhering debris can be removed as a liquid.

The inventor focused on an Sn—Ga (tin-gallium) type alloy as such an Sn alloy. Sn—Ga alloys have the special feature of an extremely low melting point of the alloy because of the low melting point of Ga, and the fact that Sn—Ga is a eutectic system.

FIG. 1 shows a phase diagram of an Sn—Ga alloy system (below, all phase diagrams are taken from "Collection of Binary Alloy Phase Diagrams," Seizo Nagasaki and Makoto Hirabayashi (eds.), issued by Agne Gijutsu Center). The vertical axis indicates temperature. The horizontal axis indicates atomic % (at %) on the lower side, and weight % (wt %) on the upper side. It is seen from this Sn—Ga alloy phase diagram that the melting point of Sn is 232° C., and that the melting point of Ga is 29.8° C. It is seen from the uppermost curve connecting the two (called the liquidus line) that the melting point drops as the Sn content ratio decreases, and that the eutectic temperature is 20.5° C. at an Sn content of 8 at %.

This temperature is lower than the melting point of either Sn or Ga. This is a special feature of eutectic systems, and an Sn—Ga alloy forms a simple eutectic system. Incidentally, the large triangular region that is surrounded by the liquidus line from the melting point of Sn (232° C.) to the eutectic point (20.5° C. at 8 at % Sn), eutectic line at 20.5° C. (horizontal straight line), and vertical curve on the Sn side, indicates a two-phase eutectic region of a liquid phase and a compound consisting chiefly of Sn (Sn ratio approximately 93%).

In any case, since the liquidus line indicates the melting point as an alloy, it is seen from this phase diagram that a region in which the Sn ratio is 15 at % or less can be used in an Sn—Ga alloy in order to obtain a melting point of 50° C. or less. A temperature of 50° C. was used as a temperature allowing easy heating in the case of use as an EUV light source target.

The second invention that is used to achieve the object described above is the first invention, wherein the atomic % of Sn in the target is 8% or less.

As is seen from FIG. 1, in the region where the atomic % of Sn is 8 % or less, the melting point is 29.8° C. at the most. Accordingly, even in cases where solid-liquid separation proceeds so that only a Ga solid solution is independently separated, the melting point is 29.8° C. at the most. Consequently, a liquid can be formed more easily.

The third invention that is used to achieve the object described above is the second invention, wherein the atomic % of Sn in the target is the eutectic composition ratio of 8%.

As is seen from FIG. 1, when the atomic % of Sn is 8%, the eutectic point is reached, and the eutectic temperature is 20.5° C. Accordingly, the target substance can be used in a liquid state even at room temperature, so that the target substance can be supplied as a liquid without any particular heating during target supply as well. Furthermore, since the scattered debris itself is also eutectic, this debris is in a liquid state at room temperature, so that cleaning is also easy. In the case of a eutectic composition, liquid phase ⟵⟶ eutectic fusion and solidification are caused to occur at the single point of the eutectic temperature without any traversal of a region where solid and liquid phases coexist, as though the substance were a simple substance. Accordingly, handling is easy. Furthermore, in the second invention described above, the Sn ratio is highest, so that the conversion efficiency of the EUV light is correspondingly increased.

The fourth invention that is used to achieve the object described above is an EUV light source in which a target substance is converted into a plasma, and the EUV light that is emitted in this case is used as a light source, wherein the target is an Sn—Ga—In (tin-gallium-indium) ternary alloy containing 15 atomic % or less Sn, 55 to 70 atomic % Ga, and 20 to 30 atomic % In, with the sum of the atomic % of Sn, atomic % of Ga, atomic % of In, and atomic % of impurities being 100%.

Among ternary alloys containing Sn, Sn—Ga—In (tin-gallium-indium) ternary alloys have a low melting point. In such alloys, the melting point can be lowered to 15° C. or less by using an alloy with an Sn content of 15 atomic % or less, a Ga content of 55 to 70 atomic %, and an In content of 20 to 30 atomic %.

The fifth invention that is used to achieve the object described above is the fourth invention, wherein the target is an Sn—Ga—In (tin-gallium-indium) ternary alloy having the eutectic composition ratio and consisting of 62 atomic % Ga, 13 atomic % Sn, and the remainder In and impurities.

In this invention, the melting point of the target is 5° C., so that the target is in a completely liquid state at ordinary temperatures.

The sixth invention that is used to achieve the object described above is an EUV exposure apparatus in which a mask is irradiated with ETV light from an EUV light source via an illumination optical system, and a pattern formed on the mask is exposed and transferred to a reactive substrate such as a wafer by a projection optical system, wherein the EUV light source is the EUV light source of any of the first through fifth inventions.

In this invention, since a plasma EUV light source having a high conversion efficiency is used, an ETV light source which has a large quantity of light can be realized, so that the throughput can be increased.

The seventh invention that is used to achieve the object described above is a semiconductor device manufacturing method having a process in which a pattern formed on a mask is exposed and transferred to a reactive substrate such as a wafer using the EUV exposure apparatus constituting the sixth invention.

In this invention, since an exposure apparatus with a good throughput is used, the production efficiency of semiconductor devices can be increased.

BEST MODE FOR CARRYING OUT THE INVENTION

Figure 3:
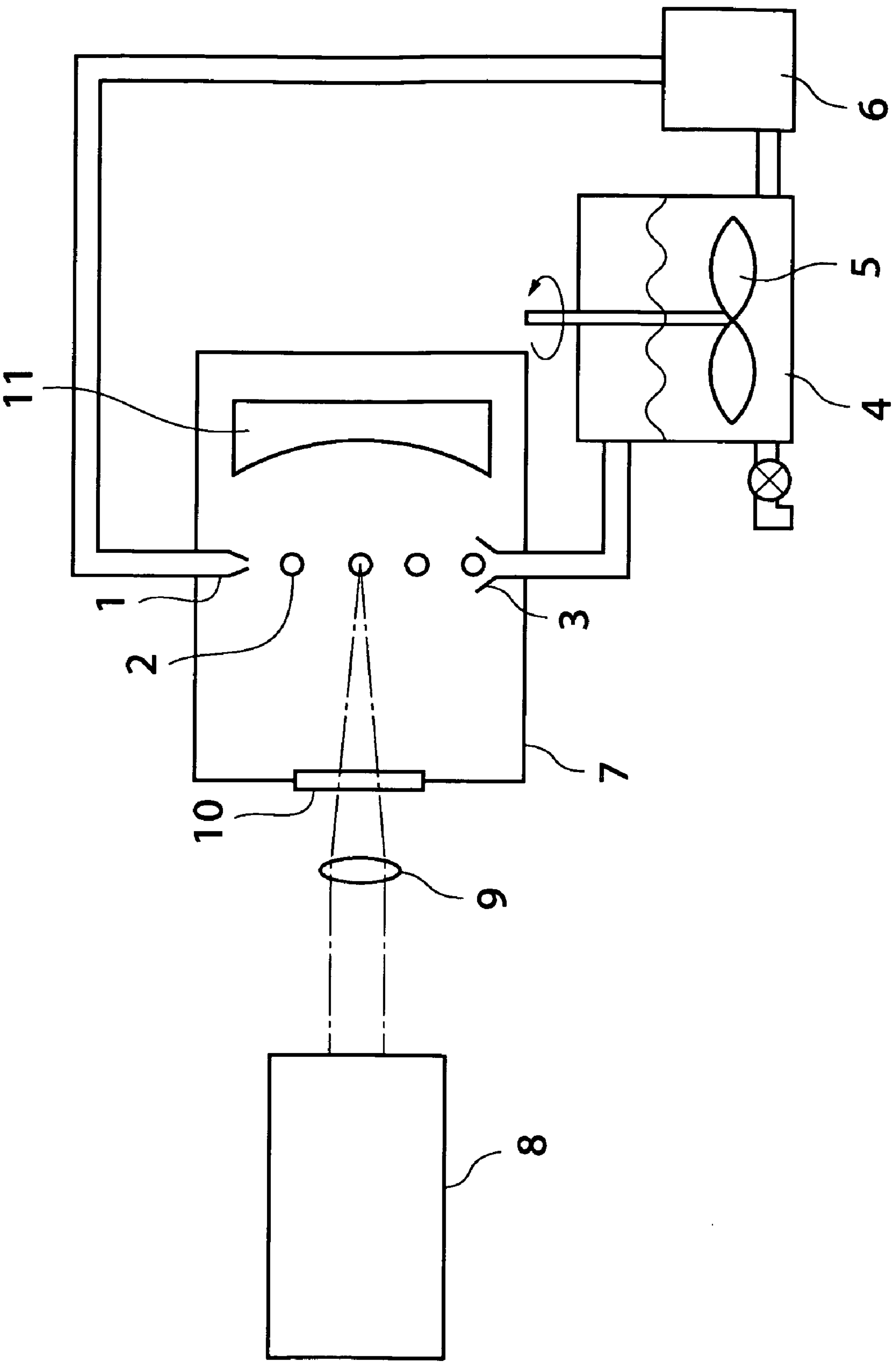
FIG. 3 is a diagram showing an outline of a laser plasma EUV light source constituting a first working configuration of the present invention.

Working configurations of the present invention will be described below using the figures. FIG. 3 is a diagram showing an outline of a laser plasma EUV light source constituting a first working configuration of the present invention.

An Sn—Ga type alloy or Sn—Ga—In ternary alloy (hereafter respectively abbreviated to "Sn alloys") having a composition in the range of the present invention is accommodated inside a heated tank 4. A solution agitation mechanism 5 is provided in order to make the temperature of the Sn alloy in the tank 4 uniform, and in order to make the composition of the alloy uniform. In this example, the solution agitation mechanism 5 is a mechanism that causes vanes to rotate in the liquid.

The tank 4 is connected to a pressurizing pump 6 by piping, and the Sn alloy pressurized by this pressurizing pump is conducted to a nozzle 1, so that a liquid-form Sn alloy is caused to jet from the tip end of this nozzle 1 disposed inside a vacuum chamber 7. The piping extending from the tank 4 to the nozzle 1 via the pressurizing pump 6 is all heated so that the Sn alloy does not solidify en route. However, such a heating mechanism is not absolutely necessary in cases where the melting point of the Sn alloy is sufficiently low.

The liquid-form Sn alloy that is caused to jet from the nozzle 1 has a spherical shape as a result of surface tension, and forms a target 2. The pressurizing pressure, the diameter of the nozzle 1, and the like are set so that a target 2 of fixed dimensions is supplied from the nozzle 1 for a fixed time interval. It is desirable that the target 2 be set so that this target agrees with the amount of target that is converted into plasma and consumed by exactly one pulse of laser irradiation. If the target is too large, the remaining portion of the target that is not converted into plasma will be the cause of debris; accordingly, such an excessively large size is undesirable. Conversely, if the target is too small, the conversion efficiency drops; accordingly, such a small size is likewise undesirable.

A laser introduction window 10 used for the introduction of laser light is formed in the vacuum chamber 7, and laser light generated by an Nd:YAG laser light source 8 disposed on the outside of the vacuum chamber 7 is focused by a lens 9 and introduced into the vacuum chamber 7.

The respective parts are disposed so that the target 2 passes through the focal position of the laser, and the target supply and laser pulses are synchronously controlled so that laser pulses are emitted precisely when the target 2 arrives at the focal position. Specifically, the position of the target 2 is monitored by a monitoring mechanism (not shown in the figure), and a light emission trigger is applied to the Nd:YAG laser light source 8 when the target 2 arrives at the focal position of the laser.

The target 2 that is irradiated by the laser is converted into a plasma, and radiates light that includes EUV light. A focusing mirror 11 focuses the EUV light that is generated from the plasma, and conducts this light to the illumination optical system (not shown in the figure). The focusing mirror 11 has a reflective surface which has the shape of an ellipsoid of revolution, and the reflective surface of this mirror is coated with a multilayer Mo/Si film. Furthermore, one focal position of the ellipsoid of revolution is the focal position of the laser, i.e., the position where EUV light is generated. Accordingly, the light that is reflected by the focusing mirror 11 is focused at the other focal position, and is then conducted into the illumination optical system.

The residue of the target 2 that remains without being converted into a plasma is recovered by a target recovery mechanism 3. The recovered target residue is returned to the tank 4, and is reutilized after being again heated and melted. A backflow prevention mechanism (not shown in the figure) is disposed between the target recovery mechanism 3 and the tank 4, so that the backflow of vapor inside the tank into the vacuum chamber 7 is prevented.

Figure 4:
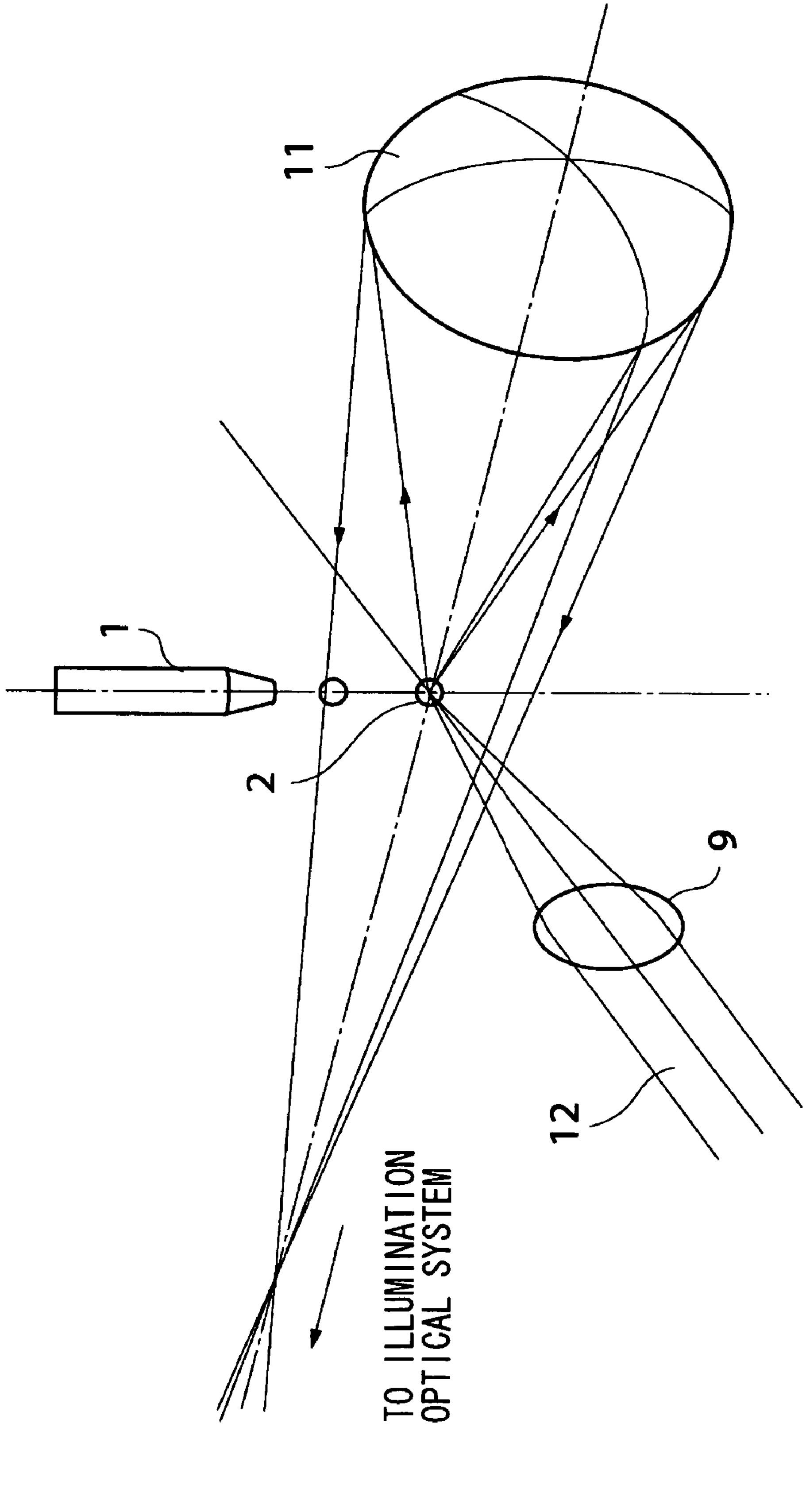
FIG. 4 is a diagram showing the relationship of the respective dispositions of the nozzle that supplies the target, the laser light and the focusing mirror in the working configuration of the present invention shown in FIG. 3.

In FIG. 3, it appears that the ETV light that is reflected by the focusing mirror 11 interferes with the laser introduction window 10 and the like. In actuality, however, as is shown in FIG. 4, the parts are disposed so that the central axis of the nozzle 1 that supplies the target 2, the central axis of the laser light 12, and the axis of the principal rays of the EUV light that is reflected by the focusing mirror 11 are perpendicular to each other. Accordingly, there is no interference of the EUV light with the laser introduction window 10 or the like.

Figure 5:
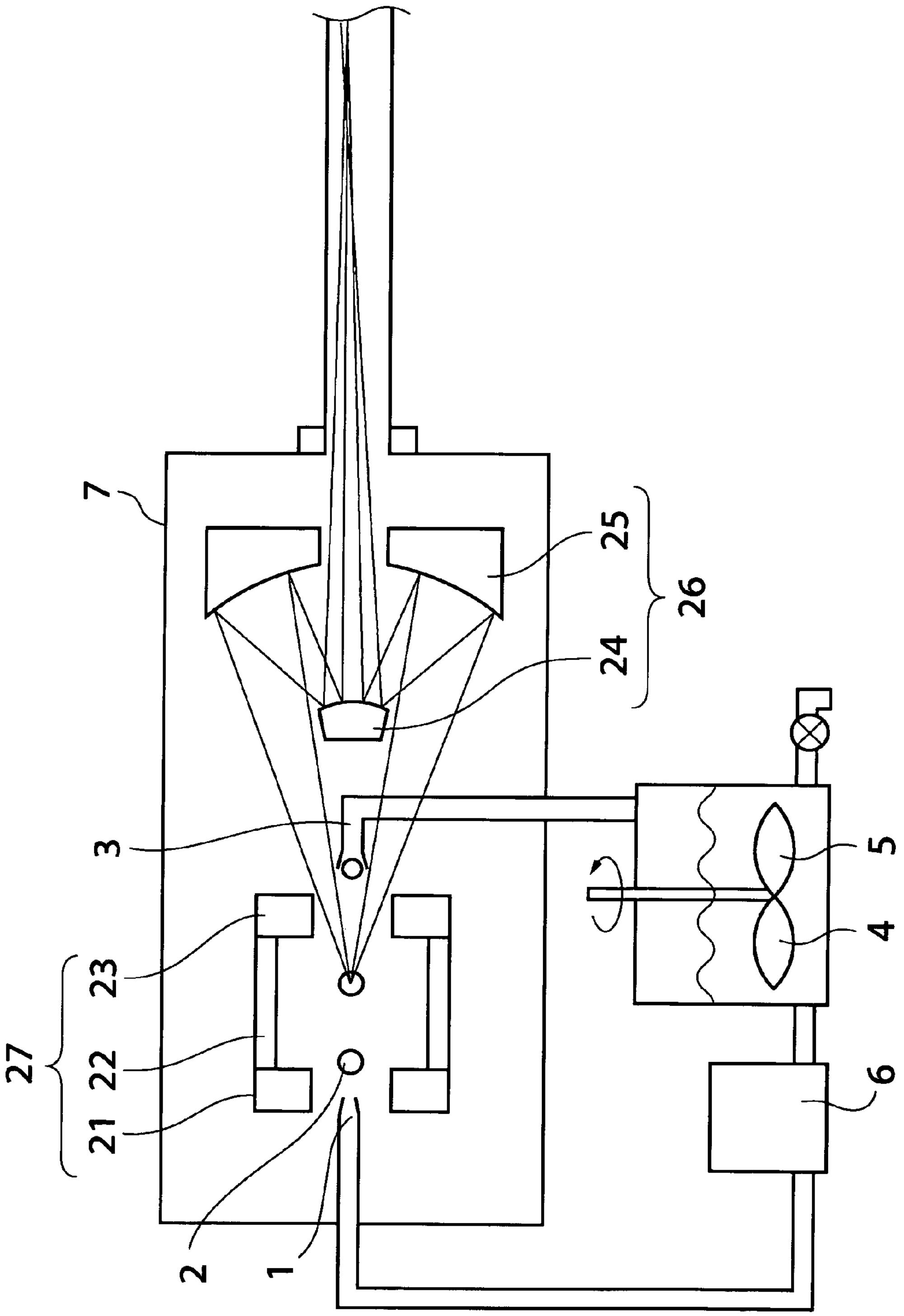
FIG. 5 is a diagram showing an outline of a discharge plasma EUV light source constituting a second working configuration of the present invention.

FIG. 5 is a diagram showing an outline of a discharge plasma ETV light source constituting a second working configuration of the present invention. An Sn alloy is accommodated inside a heated tank 4. A solution agitation mechanism 5 is provided in order to make the temperature of the Sn alloy inside the tank 4 uniform, and in order to make the composition of the alloy uniform. In this example, the solution agitation mechanism 5 is a mechanism that causes vanes to rotate in the liquid.

The tank 4 is connected to a pressurizing pump 6 by piping, and the Sn alloy pressurized by this pressurizing pump is conducted to a nozzle 1, so that a liquid-form Sn alloy caused to jet from the tip end of this nozzle 1 disposed inside a vacuum chamber 7. The piping extending from the tank 4 to the nozzle 1 via the pressurizing pump 6 is all heated so that the Sn alloy does not solidify en route. However, such a heating mechanism is not absolutely necessary in cases where the melting point of the Sn alloy is sufficiently low.

The liquid that is caused to jet from the nozzle 1 has a spherical shape as a result of surface tension, and forms a target 2. The pressurizing pressure, the diameter of the nozzle 1, and the like are set so that a target 2 of fixed dimensions is supplied from the nozzle 1 for a fixed time interval. In this working configuration as well, it is desirable that the target 2 be set so that this target agrees with the amount of target that is converted into plasma and consumed by exactly one pulse of laser irradiation. If the target is too large, the remaining portion of the target that is not converted into plasma will be the cause of debris; accordingly, such an excessively large size is undesirable. Conversely, if the target is too small, the conversion efficiency drops; accordingly, such a small size is likewise undesirable.

The target 2 that is caused to jet from the nozzle 1 is conducted into the discharge space of a Z-pinch type discharge plasma light source 27. This Z-pinch type discharge plasma light source 27 is constructed from a circular disk-form electrode (anode) 21 that has a hole formed therein, an electrode (cathode) 23 that has a similar shape, and a tubular insulator 22 that connects both of these electrodes. When a high-voltage pulse is applied across the electrode (anode) 21 and electrode (cathode) 23, the substance present in the space between these electrodes is converted into a plasma by the resulting discharge, so that light including EUV light is radiated.

The respective parts are disposed so that the target 2 passes through the discharge space, and the target supply and high-voltage pulses are synchronously controlled so that a high-voltage pulse is applied precisely when the target 2 arrives at the central position of the discharge space.

An oscillating mechanism (not shown in the figures) is disposed on the nozzle 1, so that the timing of the jetting of the liquid-form Sn alloy can be controlled by applying an oscillation to the liquid jetting direction of the nozzle 1. The oscillation applied to the nozzle 1 and the trigger applied to the high-voltage power supply are controlled so that the synchronization described above is obtained.

The focusing optical system 26 focuses the EUV light that is generated from the plasma, and conducts this light to the illumination optical system (not shown in the figures). The focusing optical system 26 is a Schwarzschild optical system that is constructed from two concentric spherical reflective surfaces 24 and 25; these reflective surfaces are coated with a multilayer Mo/Si film.

The residue of the target 2 that remains without being converted into a plasma is recovered by a target recovery mechanism 3. The recovered target residue is returned to the tank 4, and is reutilized after again being heated and melted. A backflow prevention mechanism (not shown in the figures) is disposed between the target recovery mechanism 3 and tank 4, so that the backflow of vapor from the inside of the tank into the vacuum chamber 7 is prevented.

Figure 6:
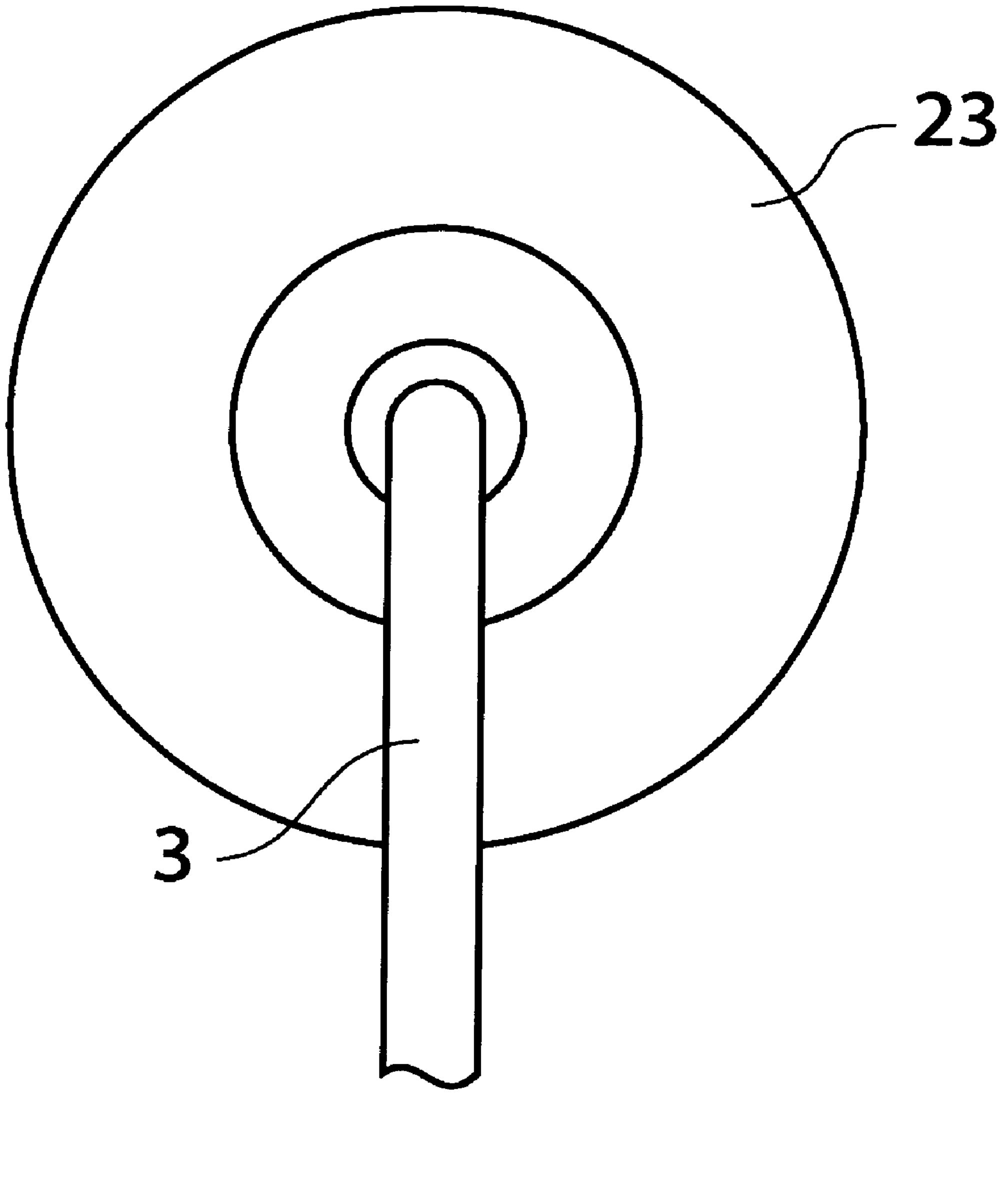
FIG. 6 is a diagram showing the positional relationship of the target recovery mechanism and the discharge plasma light source in the working configuration of the present invention shown in FIG. 5.

The positional relationship of the target recovery mechanism 3 and discharge plasma light source 27 is as shown in FIG. 6; these parts are disposed so that the central axis of the hole in the electrode 23 and the central axis of the opening part in the target recovery mechanism 3 substantially coincide with each other.

The target recovery mechanism 3 blocks a portion of the EUV light that is generated by the discharge plasma light source 27. Since the Schwarzschild optical system used in the focusing optical system 26 is an optical system with central blocking, light rays in the vicinity of the optical axis cannot be focused to begin with. In the present working configuration, the target recovery mechanism 3 is disposed as far as possible within the centrally blocked region of the Schwarzschild optical system, so that the loss of EUV light caused by such blockage is minimized.

Besides a Schwarzschild optical system, a Wolter type optical system can also be used as the focusing optical system 26; however, in this case as well, the optical system is an optical system with central blocking. Accordingly, the loss of EUV light due to blockage can be minimized by a similar disposition.

Figure 8:
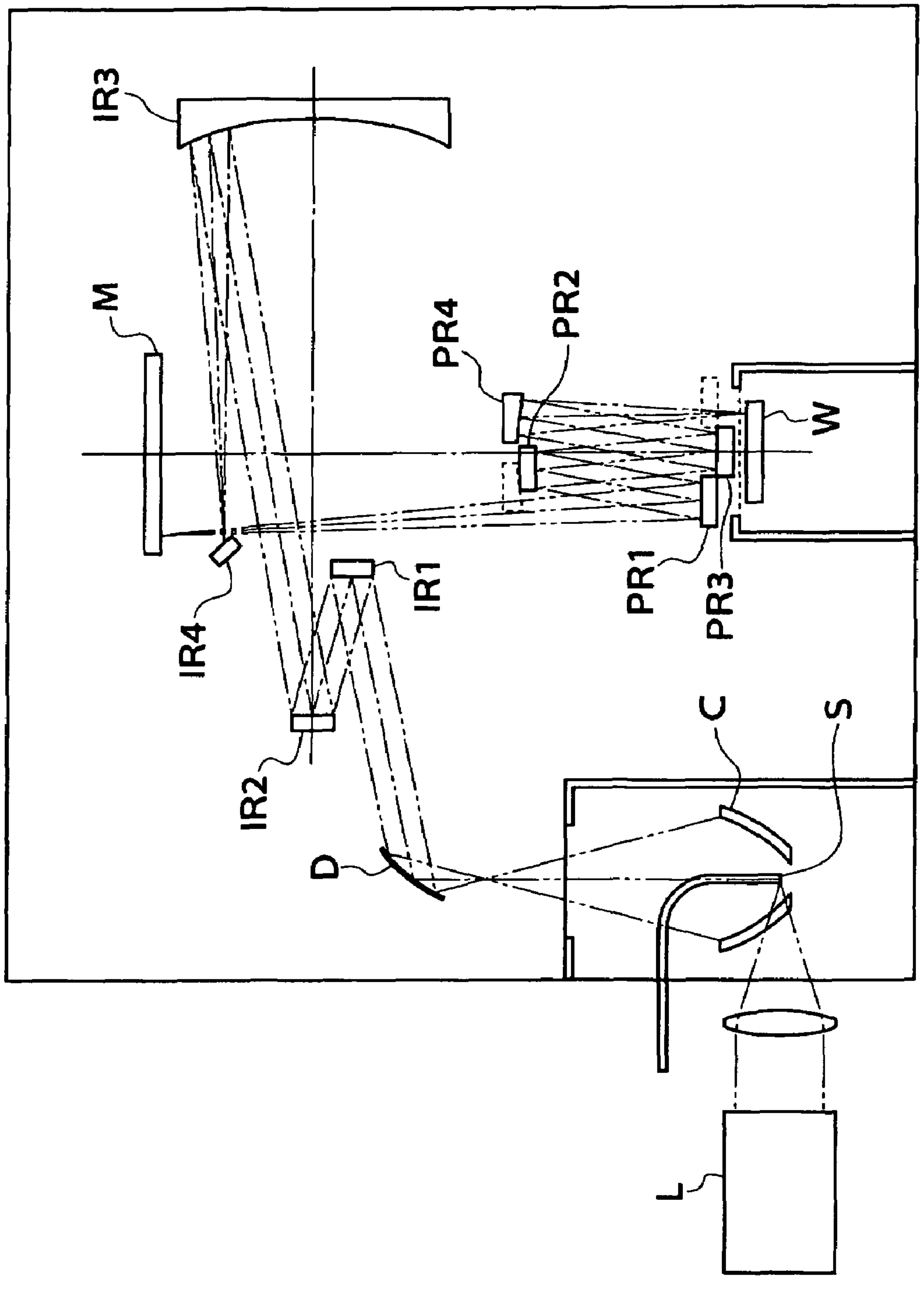
FIG. 8 is a diagram showing an outline of an EUV exposure apparatus.

The construction of the EUV exposure apparatus constituting a working configuration of the present invention is basically the same as that of the apparatus shown in FIG. 8. The only difference is that the laser plasma ELTV light source shown in the first working configuration or the discharge plasma EUV light source shown in the second working configuration is used as the ETV light source. Accordingly, a description is omitted.

Figure 7:
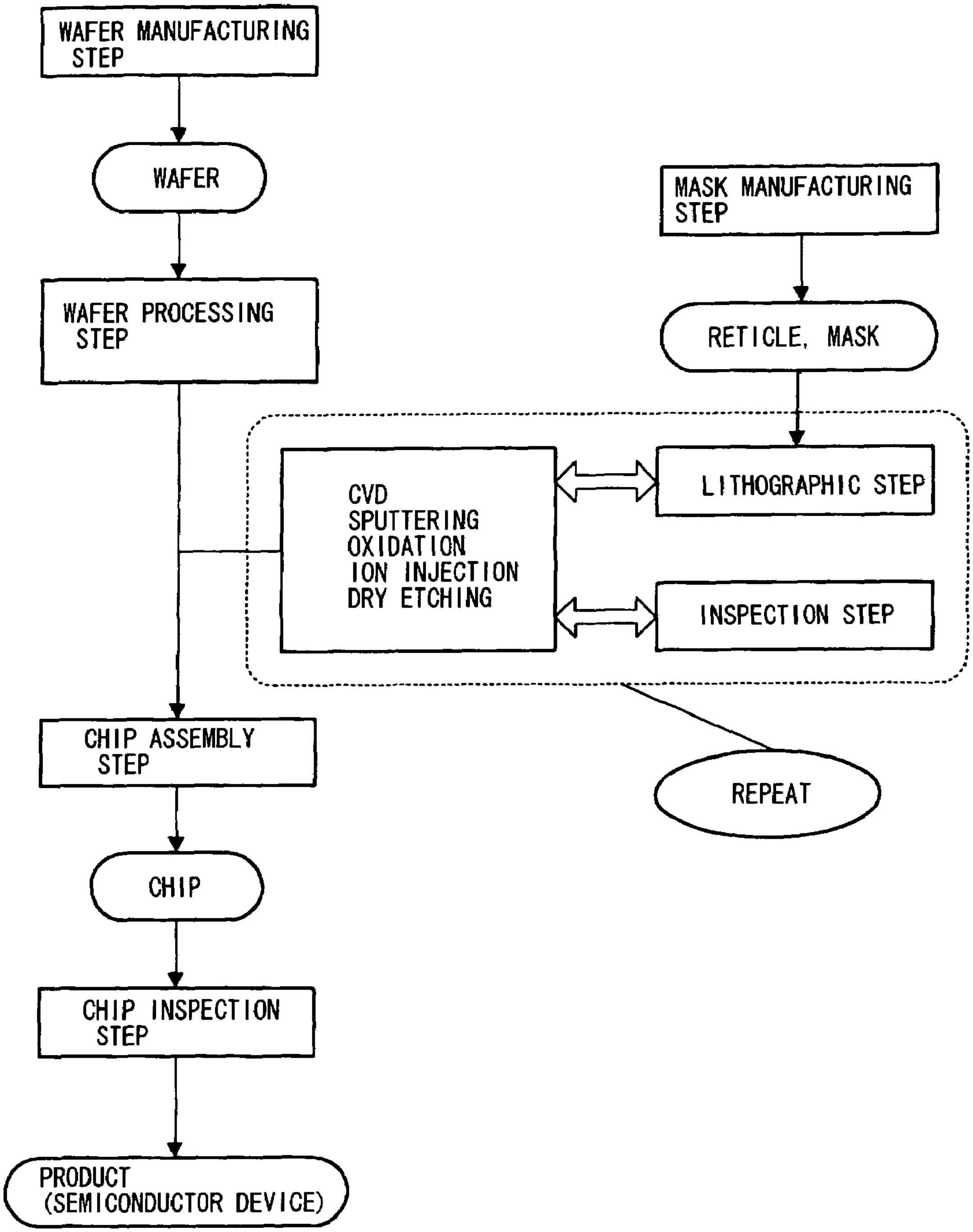
FIG. 7 is a flow chart showing one example of the semiconductor device manufacturing method of the present invention.

A working configuration of the semiconductor device manufacturing method of the present invention will be described below. FIG. 7 is a flow chart showing one example of the semiconductor device manufacturing method of the present invention. The manufacturing process of this example includes the following main steps:

(1) A wafer manufacturing step in which a wafer is manufactured (or a wafer preparation step in which a wafer is prepared);

(2) A mask manufacturing step in which the mask used in exposure is manufactured (or a mask preparation step in which such a mask is prepared);

(3) A wafer processing step in which the wafer is subjected to the necessary processing;

(4) A chip assembly step in which chips formed on the wafer are cut out one at a time, and are made operational; and (5) A chip inspection step in which the finished chips are inspected.

Furthermore, the respective steps further consist of several sub-steps.

Among these main steps, the main step that has a definitive effect on the performance of the semiconductor device is the wafer processing step. In this step, designed circuit patterns are successively laminated on the wafer, so that numerous chips that operate as memories or MPUs are formed. This wafer processing step includes the following respective steps:

(1) A thin film formation step (using CVD, sputtering, or the like) in which dielectric thin films forming insulating layers, metal thin films forming wiring parts or electrode parts, or the like, are formed;

(2) An oxidation step in which such thin film layers or the wafer substrate are oxidized;

(3) A lithographic step in which a resist pattern is formed using a mask (reticle) in order to achieve selective working of the thin film layers, wafer substrate, or the like;

(4) An etching step (e.g., using a dry etching technique) which works the thin film layers or substrate in accordance with the resist pattern;

(5) An ion/impurity injection and diffusion step;

(6) A resist stripping step; and (7) An inspection step in which the worked wafer is further inspected.

Furthermore, the wafer processing step is repeated a number of times that is equal to the required number of layers, so that semiconductor devices that operate as designed are manufactured.

In the semiconductor device manufacturing method of the present working configuration, the EUV exposure apparatus that constitutes a working configuration of the present invention is used in the lithographic step. Accordingly, the exposure of patterns that have a fine line width can be accomplished, and at the same time, exposure can be performed at a high throughput, so that semiconductor devices can be manufactured with a high efficiency.

Embodiment 1

In the present embodiment, an Sn—Ga alloy was used as the target of the light source of the EUV exposure apparatus. A composition of 8 at % Sn and 92 at % Ga was selected as the alloy composition. As is seen from the Sn—Ga system phase diagram shown in FIG. 1, this composition is the eutectic composition in an Sn—Ga alloy, and the melting point is 20.5° C. This target is a liquid at room temperature (24° C.). Accordingly, this target was placed in a liquid tank, and was caused to jet from a nozzle inside the light source chamber; the target was then converted into a plasma by irradiation with a laser, so that EUV light was emitted. The target is an Sn type target containing Sn, and has a high conversion efficiency. Furthermore, the proportion of Sn in the target is 8 at %; this amount is a sufficient supply amount for conversion into EUV light. Moreover, the remaining Ga had no deleterious effect on the generation or propagation of EUV light. It was found that the conversion efficiency that was obtained when this target was used was comparable to that obtained when simple Sn was used.

Since this target is a liquid, the used target can easily be recovered as a liquid inside the chamber, and can be passed through pipes and reutilized.

Furthermore, with regard to debris, scattered particles of the target (scattered liquid droplets) were generated during plasma conversion, and these particles adhered to the facing mirror surface and other members; however, since the target was a liquid, there was no firm adhesion to the mirror, so that the particles could easily be rinsed away and removed “as is” during maintenance.

In the steps described above, utilizing the fact that the melting point of this target was low, i.e., 20.5° C., the liquid target was used without any special operation. However, depending on the members, in cases where there are cooled areas in the vicinity so that there are parts where the temperature is 20.5° C. or less in the flow path of the target, these parts can be warmed to about 23° C. using an appropriately weak heater. In cases where there are particles adhering to the mirror as well, these particles can easily be melted by heating the mirror to a temperature that is slightly higher than the melting point. Since processing can be performed at a temperature of 25° C. or less (at the most), this temperature will cause no thermal damage to either the multilayer film or mirror substrate.

Embodiment 2

In this embodiment, an Sn—Ga alloy was used as the target of the light source of the EUV exposure apparatus. A composition of 5 at % Sn and 95 at % Ga was selected as the alloy composition. As is seen from the Sn—Ga system phase diagram shown in FIG. 1, the melting point of this composition is approximately 25° C. This target has separate solid and liquid phases at room temperature (24° C.); however, if the target is heated to approximately 30° C., all of the target becomes liquid. Accordingly, the target was stored in a solid or heated liquid state in the target storage part; then, the target was transported from there in a liquid state through heated pipes, and was vaporized inside the light source chamber. The target was then converted into a plasma in the vicinity of an electrode that produced a pulse-form high voltage, so that EUV light was generated. The target is an Sn type target that contains Sn, and has a high conversion efficiency. Furthermore, the proportion of Sn in the target is 5 at %; this amount is a sufficient supply amount for conversion into EUV light. Moreover, the remaining Ga had no deleterious effect on the generation or propagation of EUV light. It was found that the conversion efficiency that was obtained when this target was used was comparable to that obtained when simple Sn was used.

The used target can easily be recovered as a liquid inside the chamber by heating the recovery part, and can be transported via heated pipes and reutilized.

Furthermore, with regard to debris, scattered particles of the target (scattered liquid droplets) were generated during plasma conversion, and these particles adhered to the facing mirror surface and other members; however, the debris could all be liquefied by heating the mirror to approximately 30° C. during maintenance, so that the debris could easily be rinsed away and removed “as is.”

In the process described above, heating by means of a heater is required in order to melt this target; however, the temperature is approximately 30° C. at the highest. Furthermore, a melting temperature of approximately 30° C. is also sufficient for the removal of debris adhering to the mirror, so that there is no thermal damage to either the multilayer film or mirror substrate.

Embodiment 3

In this embodiment, an Sn—Ga alloy was used as the target of the light source of the EUV exposure apparatus. A composition of 12 at % Sn and 88 at % Ga was selected as the alloy composition. As is seen from the Sn—Ga system phase diagram shown in FIG. 1, the melting point of this composition is approximately 40° C. This target has separate solid and liquid phases at room temperature (24° C.); however, if the target is heated to approximately 45° C., all of the target becomes liquid. Accordingly, the target was stored in a solid or heated liquid state in the target storage part, and was transported from there in a liquid state via heated pipes, and was caused to jet from a nozzle inside the light source chamber. The target was converted into a plasma by irradiation with a laser, so that EUV light was generated. The target is an Sn type target containing Sn, and has a high conversion efficiency. Furthermore, the proportion of Sn in the target is 12 at %; this amount is a sufficient supply amount for conversion into EUV light. Moreover, the remaining Ga had no deleterious effect on the generation or propagation of EUV light. It was found that the conversion efficiency that was obtained when this target was used was comparable to that obtained when simple Sn was used.

The used target can easily be recovered as a liquid inside the chamber by heating the recovery part, and can be transported via heated pipes and reutilized.

Furthermore, with regard to debris, scattered particles of the target (scattered liquid droplets) were generated during plasma conversion, and these particles adhered to the facing mirror surface and other members; however, the debris could all be liquefied by heating the mirror to approximately 45° C. during maintenance, so that the debris could easily be rinsed away and removed “as is.”

In the process described above, heating by means of a heater is required in order to melt this target; however, the temperature is approximately 45° C. at the highest. Furthermore, a melting temperature of approximately 45° C. is also sufficient for the removal of debris adhering to the mirror, so that there is no thermal damage to either the multilayer film or mirror substrate.

Embodiment 4

In this embodiment, an Sn—Ga—In alloy was used as the target of the light source of the EUV exposure apparatus. A composition of 13 at % Sn, 62 at % Ga and 25 at % In was selected as the alloy composition. This composition is the eutectic composition in an Sn—Ga—In ternary alloy, and has a melting point of 5° C. This target is a liquid at room temperature (24° C.); accordingly, this target was placed inside a liquid tank, vaporized inside the light source chamber, and converted into a plasma in the vicinity of an electrode that generated a pulse-form high voltage, so that EUV light was generated. The target is an Sn type target containing Sn, and has a high conversion efficiency. Furthermore, the proportion of Sn in the target is 13 at %; this amount is a sufficient supply amount for conversion into EUV light. Moreover, the remaining Ga and In had no deleterious effect on the generation or propagation of EUV light. It was found that the conversion efficiency that was obtained when this target was used was comparable to that obtained when simple Sn was used.

Since this target is a liquid, the used target can easily be recovered as a liquid inside the chamber, and can be passed through pipes and reutilized.

Furthermore, with regard to debris, scattered particles of the target (scattered liquid droplets) were generated during plasma conversion, and these particles adhered to the facing mirror surface and other members; however, since the target is a liquid, there is no firm adhesion to the mirror, so that the debris can easily be rinsed away and removed "as is" during maintenance.

Utilizing the fact that the melting point of the target was low, i.e., 5° C., the liquid target was used without any special operation. However, depending on the members, in cases where there are cooled areas in the vicinity so that there are parts where the temperature is 5° C. or less in the flow path of the target, these parts can be warmed to about 10° C. using an appropriately weak heater. In cases where there are particles adhering to the mirror as well, these particles are liquid in the case of ordinary use; accordingly, there is no thermal damage to the mirror substrate, either.

<Discussion Relating to Other Alloys>

Figure 1:
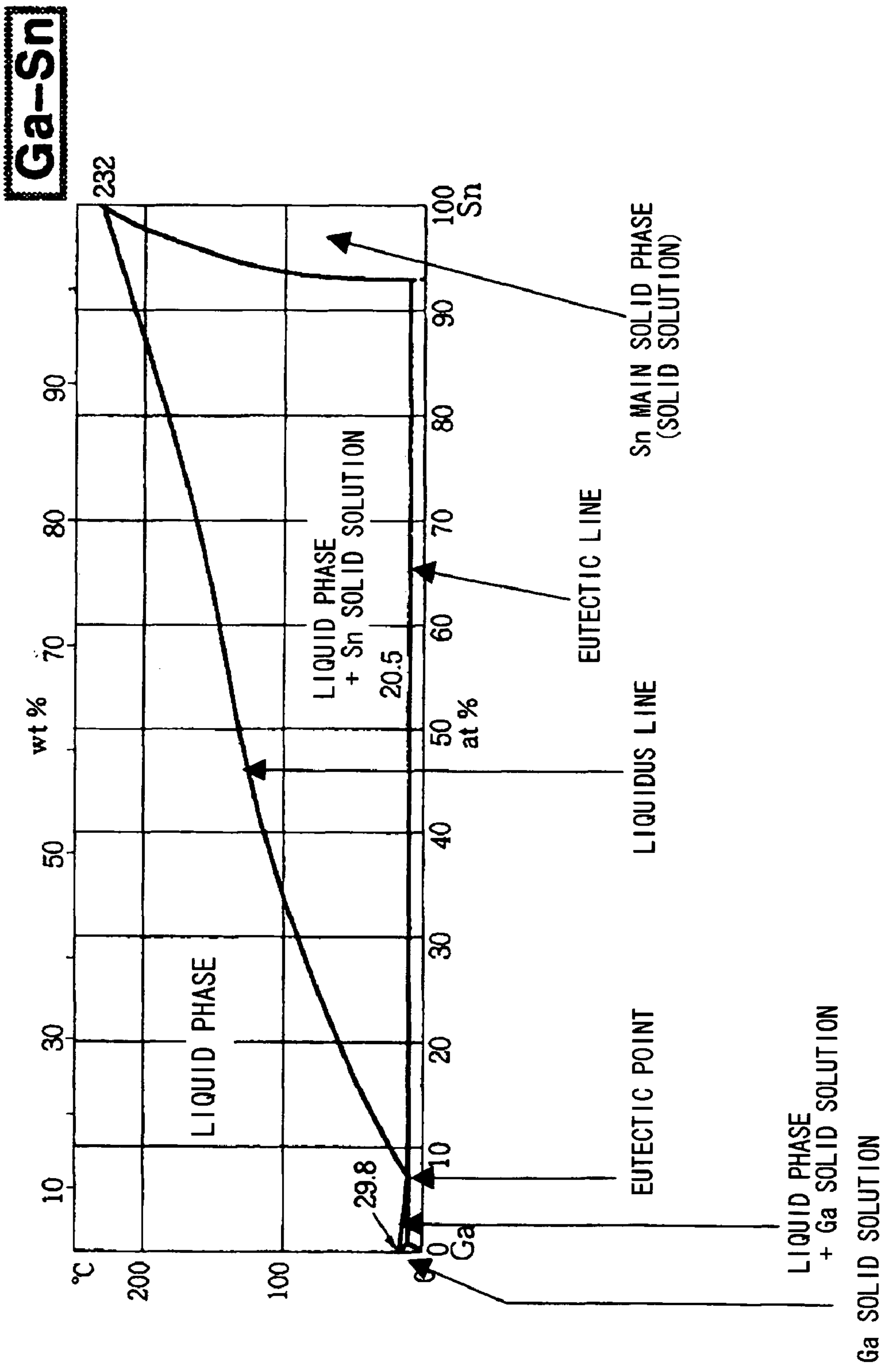
FIG. 1 is a phase diagram of an Sn—Ga alloy system.
Figure 2:
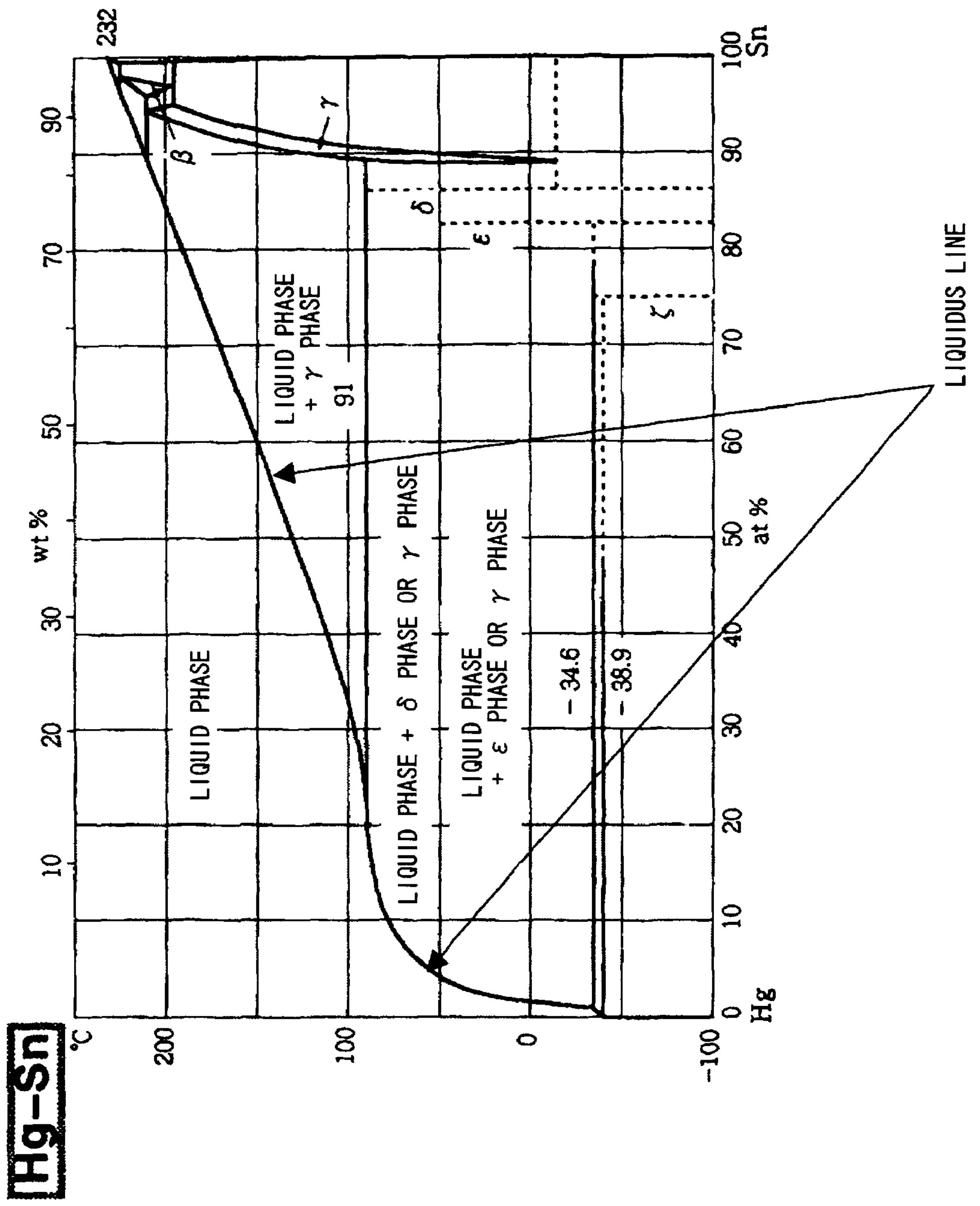
FIG. 2 is a phase diagram of an Sn—Hg type alloy.

The other metals that are used in order to manufacture Sn alloys that have a low melting point are not simply any metals that have a low melting point. A phase diagram of an Sn—Hg (tin-mercury) type alloy is shown as an example in FIG. 2. Here, however, in spite of the fact that Hg has a lower melting point than Ga (the melting point of Ga is 29.8° C., while the melting point of Hg is −39° C.), the liquidus line rises abruptly in the vicinity of an Sn content of 1 to 2 at %, so that the melting point (temperature at which complete melting occurs) rises to 90° C. or greater in a composition containing approximately 20 at % Sn. At temperatures ranging from −34.6° C. to the liquidus line, separate solid and liquid regions consisting of a liquid phase that is almost all Hg and a solid solution that is almost all Sn ($\epsilon$ phase, $\delta$ phase and $\gamma$ phase) are formed. A temperature that is equal to or greater than the liquidus is required in order to melt all of these phases completely. If FIG. 1 and FIG. 2 are superimposed, it is seen that the liquidus line in the Sn—Ga phase diagram is lower than the liquidus line in the Sn—Hg phase diagram in the composition range where the Sn content is approximately 2 to 30 at %. Accordingly, although an Sn—Hg alloy is also a candidate as an alloy with a low melting point, the region of complete melting at 50° C. or lower is a narrow range of approximately 3 to 4% Sn. Furthermore, since such alloys contain Hg, great care is required in the handling of these alloys.

For purposes of this discussion, substances other than Hg are cited as examples below.

(1) Eutectic systems in which the eutectic temperature is less than 200° C.:

Sn—In systems (tin-indium): these are eutectic systems over all, with the lowest melting point being approximately 120° C. at the eutectic point (approximately 48at % Sn). Furthermore, the melting point of In is 157° C.

Sn—Bi systems (tin-bismuth): these are purely eutectic systems, with the lowest melting point being approximately 139° C. at the eutectic point (57 at % Sn). Furthermore, the melting point of Bi is 271° C.

Sn—Tl systems (tin-thallium): the Sn side is eutectic, with the lowest melting point being 170° C. at the eutectic point (approximately 68 at % Sn). Furthermore, the melting point of Tl is 303° C.

Sn—Cd systems (tin-cadmium): these are eutectic systems, with the lowest melting point being 177° C. at the eutectic point (approximately 65 at % Sn). Furthermore, the melting point of Cd is 321° C.

Sn—Pb systems (tin-lead): these are purely eutectic systems, with the lowest melting point being 183° C. at the eutectic point (approximately 74 at % Sn). So-called solder. Furthermore, the melting point of Pb is 328° C.

Sn—Zn systems (tin-zinc): these are purely eutectic systems, with the lowest melting point being 198° C. at the eutectic point (85 at % Sn). Furthermore, the melting point of Zn is 420° C.

(2) Intermetallic compounds which have a high melting point:

Sn—Na systems (tin-sodium): the melting point of Sn is 232° C., and the melting point of Na is 97° C.; however, the melting point of the alloy may be as high as 578° C. The area in the vicinity of Sn is a eutectic system; the lowest melting point in this vicinity is approximately 215° C. at the eutectic point (approximately 95 at % Sn). In the vicinity of Na, the melting point rises abruptly with the admixture of Sn; the melting point at a slight Sn content of approximately 1 at % Sn reaches 200° C. Accordingly, the lowest melting point is approximately 97° C. in an alloy containing substantially 100% Na and almost no Sn.

(3) Alloys in which the eutectic temperature is the lowest melting point, but only the region in the vicinity of 100% Sn is a eutectic system, so that the drop in the melting point is slight.

Sn—Mg systems (tin-magnesium): eutectic systems with $Mg_2Sn$ (intermetallic compound). The lowest melting point is 200° C. at the eutectic point (approximately 93 at % Sn). Furthermore, the melting point of Mg is 650° C.

Sn—Au systems (tin-gold): since only the area in the vicinity of Sn is a eutectic system, the lowest melting point is the eutectic point, but is close to the melting point of Sn at 217° C. (approximately 91 at % Sn). Furthermore, the melting point of Au is 1063° C.

Sn—Ag systems (tin-silver): since only the area in the vicinity of Sn is a eutectic system, the lowest melting point is the eutectic point, but is close to the melting point of Sn at 221° C. (approximately 95 at % Sn). Furthermore, the melting point of Ag is 962° C.

Sn—Cu systems (tin-copper): since only the area in the vicinity of Sn is a eutectic system, the lowest melting point is the eutectic point, but is close to the melting point of Sn at 227° C. (approximately 99 at % Sn). Furthermore, the melting point of Cu is 1083° C.

Sn—Al systems (tin-aluminum): these are purely eutectic systems, but the eutectic point is inclined considerably toward Sn; accordingly, the lowest melting point is the eutectic point, but is substantially the same as the melting point of Sn at 228° C. (approximately 98 at % Sn). Furthermore, the melting point of Al is 660° C.

Sn—Pt systems (tin-platinum): since only the area in the vicinity of Sn is a eutectic system, the lowest melting point is the eutectic point, but is substantially the same as the melting point of Sn at 228° C. (approximately 98 at % Sn). Furthermore, the melting point of Pt is 1769° C.

Sn—Co systems (tin-cobalt): since only the area in the vicinity of Sn is a eutectic system, the lowest melting point is the eutectic point, but is close to the melting point of Sn at 229° C. (approximately 99 at % Sn). Furthermore, the melting point of Co is 1495° C.

Sn—Y systems (tin-yttrium): since only the area in the vicinity of Sn is a eutectic system, the lowest melting point is the eutectic point, but is close to the melting point of Sn at 229° C. (approximately 99 at % Sn). Furthermore, the melting point of Y is 1522° C.

Sn—Te systems (tin-tellurium): a eutectic system is formed with the intermetallic compound SnTe; however, the eutectic point is substantially the same as that of Sn, so that the lowest melting point is 232° C. (99 t % Sn). Furthermore, the melting point of Te is 450° C.

Sn—Ge systems (tin-germanium): these systems are eutectic systems, but the eutectic point is substantially the same as that of Sn, so that the lowest melting point is 232° C. (99.7 at % Sn). Furthermore, the melting point of Ge is 938° C.

(4) Peritectic systems or the like in which the melting point is caused to rise as a result of the admixture of the other metal (systems in which the lowest melting point is the melting point of Sn).

Sn—As systems (tin-arsenic), Sn—Fe systems (tin-iron), Sn—Mn systems (tin-manganese), Sn—Nb systems (tin-niobium), Sn—Ni systems (tin-nickel), Sn—Pd systems (tin-palladium), Sn—Sb systems (tin-antimony) Sn—Se systems (tin-selenium)

Among all of the systems in the above list, the systems listed under (3) and (4) are unsuitable for practical use (the melting point is higher than that of Sn, or substantially the same as that of Sn). The systems of (2) have a low melting point in the Na-rich regions, but these systems can contain hardly any Sn. The systems of (1) are the most practical sets of alloys; however, since the melting point is 120° C. (eutectic point) even in the case of In (indium) which gives the lowest melting point among these systems, it is necessary to set the temperature at 120° C. or greater if heating is used as a means of continuous target supply and debris removal. In comparison, it is seen that the eutectic point of 20.5° C. shown by an Sn—Ga system is suitable for the target of an EUV light source.

The invention claimed is:

1. An EUV light source comprising:

a target substance, wherein the target substance is an Sn—Ga (tin-gallium) type alloy in which the atomic % of Sn is 15% or less; and an energy source for directing energy at the target substance so that the energy is applied to the target substance, wherein energy applied to the target substance produces a plasma, and wherein the plasma generates and emits EUV light.

2. The EUV light source according to claim 1, wherein the atomic % of Sn in the target substance is 8% or less.

3. The EUV light source according to claim 2, wherein the atomic % of Sn in the target substance is the eutectic composition amount of 8%.

4. The EUV light source of claim 1, wherein the energy source comprises a laser light source.

5. The EUV light source of claim 1, wherein the energy source comprises an electric discharge source.

6. An EUV light source comprising:

a target substance, wherein the target substance is an Sn—Ga—In (tin-gallium-indium) ternary alloy containing 15 atomic % or less Sn, 55 to 70 atomic % Ga, and 20 to 30 atomic % In, with the sum of the atomic % of Sn, atomic % of Ga, atomic % of In, and atomic % of impurities being 100%; and an energy source for directing energy at the target substance so that the energy is applied to the target substance, wherein energy applied to the target substance produces a plasma, and wherein the plasma generates and emits EUV light.

7. The EUV light source according to claim 6, wherein the target substance is an Sn—Ga—In (tin-gallium-indium) ternary alloy having the eutectic composition amount, and consisting of 62 atomic % Ga, 13 atomic % Sn, and the remainder In and impurities.

8. The EUV light source of claim 6, wherein the energy source comprises a laser light source.

9. The EUV light source of claim 6, wherein the energy source comprises an electric discharge source.

10. An EUV exposure apparatus comprising:

an EUV light source comprising:

a target substance comprising an Sn—Ga (tin-gallium) alloy in which the atomic % of Sn is 15% or less, and an energy source for directing energy at the target substance so that the energy is applied to the target substance, wherein energy applied to the target substance produces a plasma, and wherein the plasma generates and emits EUV light, an illumination optical system, and a projection optical system, wherein a pattern formed on a mask is exposed and transferred to a reactive substrate by the projection optical system.

11. A semiconductor device manufacturing method comprising the step of:

transferring the pattern formed on the mask to a reactive substrate using the EUV exposure apparatus according to claim 10.

12. The semiconductor device manufacturing method according to claim 11, wherein the target substance further comprises In, and is an Sn—Ga—In (tin-gallium-indium) ternary alloy further containing 55 to 70 atomic % Ga, and 20 to 30 atomic % In, with the sum of the atomic % of Sn, atomic % of Ga, atomic % of In, and atomic % of impurities being 100%.

13. An EUV exposure apparatus comprising:

an EUV light source comprising:

a target substance comprising an Sn—Ga—In (tin-gallium-indium) ternary alloy containing 15 atomic % or less Sn, 55 to 70 atomic % Ga, and 20 to 30 atomic % In, with the sum of the atomic % of Sn, atomic % of Ga, atomic % of In, and atomic % of impurities being 100%, and an energy source for directing energy at the target substance so that the energy is applied to the target substance, wherein energy applied to the target substance produces a plasma, and wherein the plasma generates and emits EUV light, an illumination optical system, and a projection optical system, wherein a pattern formed on a mask is exposed and transferred to a reactive substrate by the projection optical system.

* * * * *